United States Patent
Hindman et al.

[11] Patent Number: 5,881,470
[45] Date of Patent: Mar. 16, 1999

[54] VERTICAL TOWER FOR A TWO-AXIS MEASUREMENT SYSTEM

[75] Inventors: Gregory E. Hindman, Redondo Beach; Dan Slater, La Habra Heights; Thomas Paige, Cypress, all of Calif.

[73] Assignee: Nearfield Systems Incorporated, Carson, Calif.

[21] Appl. No.: 701,308

[22] Filed: Aug. 21, 1996

[51] Int. Cl.⁶ .................................................. G01B 5/004
[52] U.S. Cl. ............................................. 33/503; 33/1 M
[58] Field of Search .......................... 33/503, 1 M, 556, 33/558, 559, 561

[56] References Cited

U.S. PATENT DOCUMENTS

| | | | |
|---|---|---|---|
| 4,833,789 | 5/1989 | Zona | 33/503 |
| 4,953,306 | 9/1990 | Weckenmann et al. | 33/503 |
| 5,152,070 | 10/1992 | Sorokes | 33/503 |
| 5,285,397 | 2/1994 | Heier et al. | 33/503 |
| 5,408,318 | 4/1995 | Slater . | |

*Primary Examiner*—Christopher W. Fulton
*Attorney, Agent, or Firm*—Graham & James LLP

[57] ABSTRACT

A two-axis measurement system includes a structural support frame having at least two horizontally disposed parallel rails defining a length of the structural support frame at opposite sides thereof. The support frame further defines a test space between the opposite sides. A bridge extends perpendicularly between the rails and is capable of controlled movement along the rails over the length of the structural support frame. A first probe carriage carried by the bridge permits controlled movement along a span of the bridge. A vertical tower is coupled to the bridge orthogonally with the rails, and a second probe carriage is carried by the vertical tower permitting controlled movement along a height of the vertical tower. The first probe carriage is selectively moveable within a horizontal test plane defined in a first axial dimension by the rails and in a second axial dimension by the bridge by cooperative movement of the bridge and the first probe carriage. The second probe carriage is selectively moveable within a vertical test plane defined in the first axial dimension by the rails and in a third axial dimension by the vertical tower by cooperative movement of the bridge and the second probe carriage.

18 Claims, 5 Drawing Sheets

VERTICAL TOWER FOR A TWO-AXIS MEASUREMENT SYSTEM

BACKGROUND OF THE INVENTION

1. Field of the Invention

The present invention relates to two-axis measurement systems, and more particularly, to a robotic scanner for performing planar near-field antenna measurements capable of operating in either a vertical or a horizontal orientation.

2. Description of Related Art

High performance antennas are increasingly prevalent in the art as spacecraft, aircraft, ship and ground vehicle mission requirements become more sophisticated. One problem in the development and manufacture of high performance antennas is the measurement of antenna performance. Traditionally, antenna measurement was conducted by placing the antenna at a remote location, and measuring the amplitude and phase response characteristics of the antenna in its operational range. Typical operational distances for high gain antennas can range from fifty feet to three miles. This measurement technique, known as far-field testing, suffers from significant limitations, such as susceptibility to weather effects, ground reflections and increasing real estate costs.

As an alternative to far-field testing, near-field testing was developed. A near-field test is conducted in an indoor test range using a microwave probe to sample the field radiated near the antenna under test (AUT). A computer collects the amplitude and phase data sampled by the microwave probe, and calculates the far-field equivalent response using a Fourier transform technique. Accurate near-field measurements require that all the significant antenna energy be sampled by the microwave probe. Highly directive antennas, such as reflectors and waveguide phased arrays, beam most of the energy in the forward direction normal to the antenna aperture. To test these types of antennas, a planar near-field robotic scanner is utilized to move the microwave probe along a planar pattern approximately normal to the antenna aperture. To accurately reconstruct the measured field, the probe must sample the antenna energy at a plurality of points with a minimum spacing based on the Nyquist sampling theorem. Near-field measurement systems of this nature are described in U.S. Pat. Nos. 5,408,318 and 5,419,631, both to Slater, and assigned to the same assignee as the present invention.

The physical configuration of the near-field robotic scanner will often depend on the size and performance characteristics of the antenna under test. An antenna having a particularly large aperture, or one that is gravity sensitive, may be measured using a horizontally oriented scanner. Such a scanner may be supported by a frame structure that envelopes the antenna under test and defines a horizontal plane over the antenna. The antenna would radiate directly upward and the probe would sample the antenna's energy as the probe moves through the horizontal plane. The frame may be rigidly and/or permanently attached to the ground so as to provide a highly stable platform. Such stability is necessary to provide a high degree of planarity and avoid undesired variations in the probe position that would reduce the accuracy of the measurement.

Conversely, smaller antennas may be measured using a vertically oriented scanner. These scanners may be lighter in weight and construction than the horizontally oriented scanners, thus providing a degree of portability for such measurement systems. The vertically oriented scanners also have a frame structure that, unlike the horizontally oriented scanners, defines a vertical plane alongside an antenna under test. This vertical orientation may be desirable for testing a spacecraft antenna having heat pipes which are gravitationally sensitive. The antenna would be oriented to radiate sideways with the antenna aperture disposed normal to the vertical plane and the probe sampling the antenna's energy as the probe moves through the vertical plane.

Given the distinct advantages of each of the horizontally and vertically oriented scanners, it would be additionally advantageous to provide a single robotic scanner capable of both horizontal and vertical operation. Such a system would yield substantial additional flexibility and resulting cost savings by permitting the same basic measurement system to be used to test a variety of different antenna sizes, types and orientations. Thus, a critical need exists to provide a robotic scanner for planar near-field antenna measurements which is capable of selectively performing in either a vertical or a horizontal orientation.

SUMMARY OF THE INVENTION

In accordance with the teachings of the present invention, a two-axis measurement system is provided that permits planar near-field antenna measurements to be performed in either or both of a horizontal or a vertical orientation, as well as an intermediate orientation between the horizontal and vertical orientations. The system greatly enhances the flexibility of conventional robotic scanners used for near-field antenna measurement.

More particularly, the two-axis measurement system comprises a structural support frame including a plurality of support members disposed at first and second sides thereof. The support frame defines a test space between the first and second sides. A test probe is selectively manipulated within either a horizontal test plane of the test space or a vertical test plane of the test space. As it is manipulated, the test probe samples energy emitted from an antenna under test in order to perform a near-field measurement.

In a first embodiment of the two-axis measurement system, the structural support frame includes at least two horizontally disposed parallel rails defining a length of the structural support frame at opposite sides thereof. A bridge extends perpendicularly between the rails and is capable of controlled movement along the rails over the length of the structural support frame. A first probe carriage carried by the bridge permits controlled movement along a span of the bridge. A vertical tower is coupled to the bridge orthogonally with the rails, and a second probe carriage is carried by the vertical tower permitting controlled movement along a height of the vertical tower. The first probe carriage is selectively moveable within a horizontal test plane defined in a first axial dimension by the rails and in a second axial dimension by the bridge by cooperative movement of the bridge and the first probe carriage. The second probe carriage is selectively moveable within a vertical test plane defined in the first axial dimension by the rails and in a third axial dimension by the vertical tower by cooperative movement of the bridge and the second probe carriage.

In a second embodiment of the two-axis measurement system, a boom is pivotally mounted to the bridge about the first axial direction defined by the rails. The boom is selectively pivotable between a folded position wherein the boom extends in parallel with the bridge, and a deployed position wherein the boom extends in a third axial direction orthogonal to both the first and second axial directions. A probe carriage is carried by the boom and is capable of controlled movement along an extent of the boom. The first position of the boom permits selective movement of the probe carriage within a horizontal test plane defined in the first and second axial dimensions by cooperative movement of the bridge and the probe carriage, and the second position of the boom permits selective movement of the probe carriage within a vertical test plane defined in the first and third axial dimensions by cooperative movement of the bridge and the probe carriage.

A more complete understanding of the vertical tower for a two-axis measurement system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the critical need for a robotic scanner to conduct planar near-field antenna measurements which is capable of selectively operating in either a vertical or a horizontal orientation. The measurement system of the present invention provides substantial additional flexibility and cost savings over conventional robotic scanners by permitting a single measurement system to be used to test a variety of different antenna types. In the detailed description that follows, like element numerals are used to identify like elements in one or more of the figures.

Figure 1:
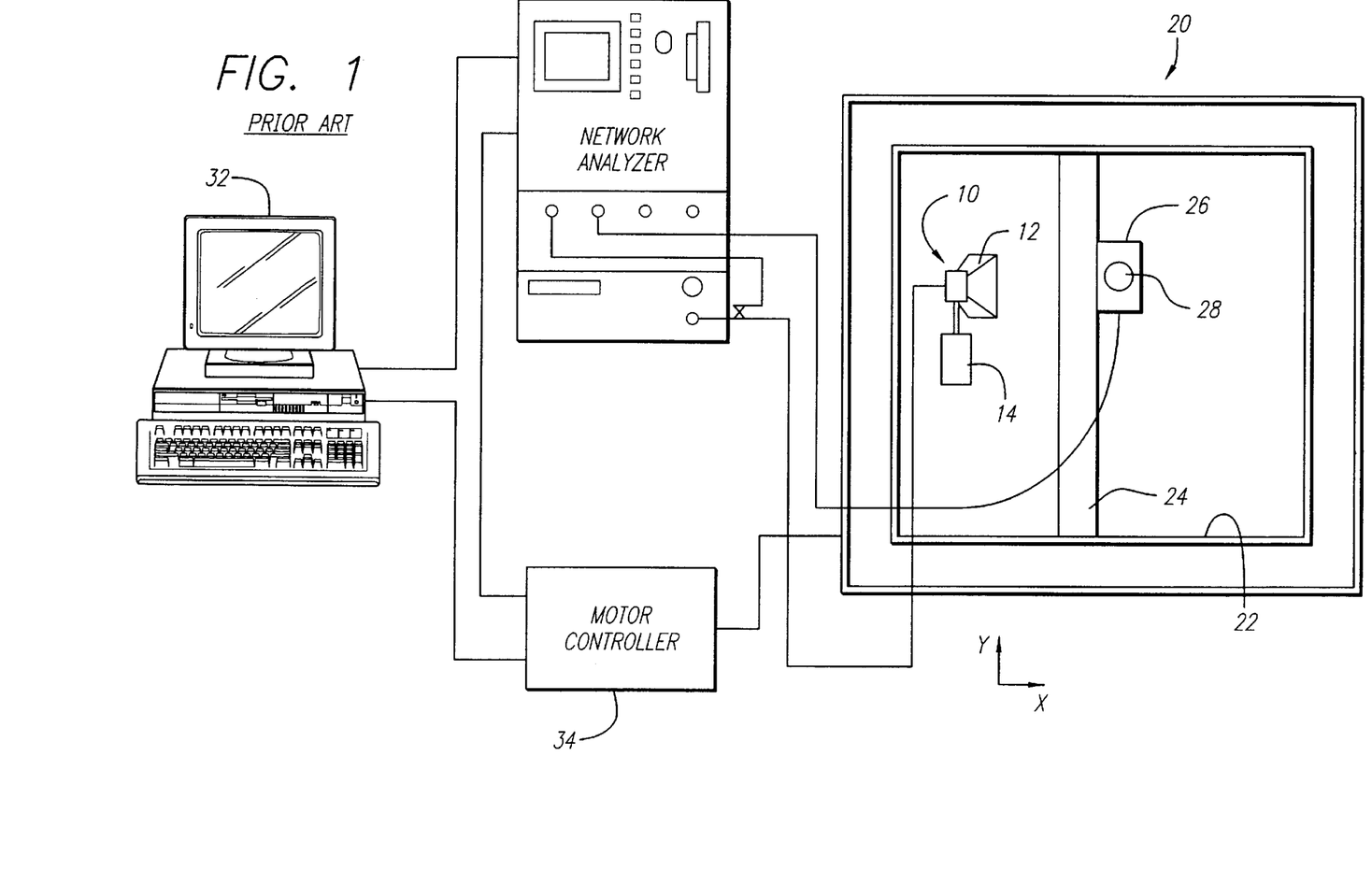
FIG. 1 illustrates a conventional near-field antenna measurement system.

Referring first to FIG. 1, a conventional near-field antenna measurement system is illustrated. The conventional near-field antenna measurement system comprises a robotic scanner 20, a network analyzer 30, a motor controller 34 and a computer 32. Each of the elements of the near-field antenna measurement system may be disposed within a single test location, or may be distributed with the robotic scanner 20 disposed in one location, such as a test chamber, and the other control elements disposed in another location, such as a control room in proximity to the test chamber.

An antenna under test (AUT) 10 is secured to a test stand 14 so that it faces the robotic scanner 20. The exemplary AUT 10 has a feedhorn 12 which directs power from an aperture of the AUT. In FIG. 1, the plane of the robotic scanner 20 is oriented vertically and is defined by a horizontally disposed x-axis rail 22 and a vertically disposed y-axis rail 24 that intersects perpendicularly with the x-axis rail. The y-axis rail 24 is capable of horizontal movement along the length of the x-axis rail 22. A probe carriage 26 is provided on the y-axis rail 24 that is capable of vertical movement along the length of the rail. A microwave probe 28 extends from the probe carriage 26 normal to the plane formed by the scanner 20. Precision controlled motors (not shown) may be utilized to manipulate the y-axis rail 24 along the length of the x-axis rail 22 and to manipulate the probe carriage 26 along the length of the y-axis rail, in association with other conventional mechanical control systems such as a rack and pinion drive.

To operate the near-field test system, the microwave probe 28 must be moved in a repeatable pattern relative to the stationery AUT 10 to sample amplitude and phase data emitted by the AUT. To obtain an accurate near-field measurement of the AUT, the movement of the probe 28 must be perfectly planar. Exposed surfaces of the robotic scanner 20 may be covered with a microwave energy absorbent material in order to preclude undesired reflections of antenna energy from adversely effecting the collection of data by the probe 28. The motor controller 34 controls the position of the probe 28 as it moves along the sample points by selectively manipulating the precision motors that move the y-axis rail 24 and the probe carriage 26. The network analyzer 30 receives the antenna energy data that is sampled by the probe 28 and compiles the data into digital signals that are readable by the computer 32. The computer 32 controls the overall operation of the near-field test system, and processes the digital signals compiled by the network analyzer 30 to produce the far-field equivalent response for the AUT 10.

Figure 2:
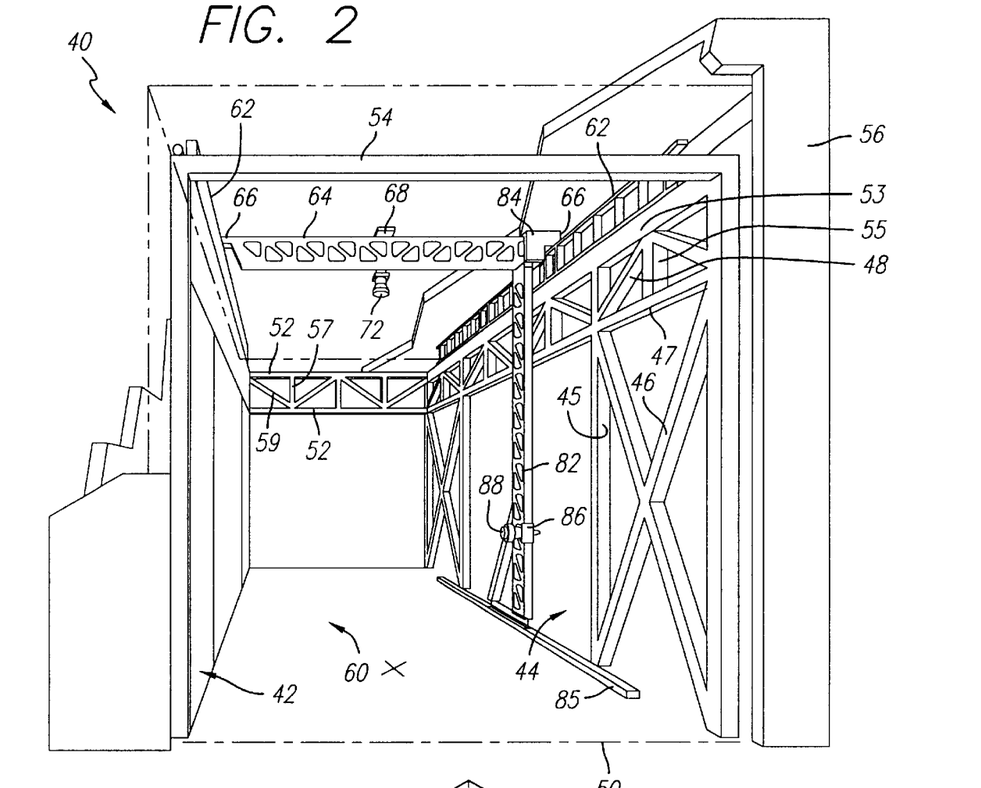
FIG. 2 is a partial perspective view of a horizontally oriented robotic scanner having a vertical tower to permit vertically oriented operation.
Figure 3:
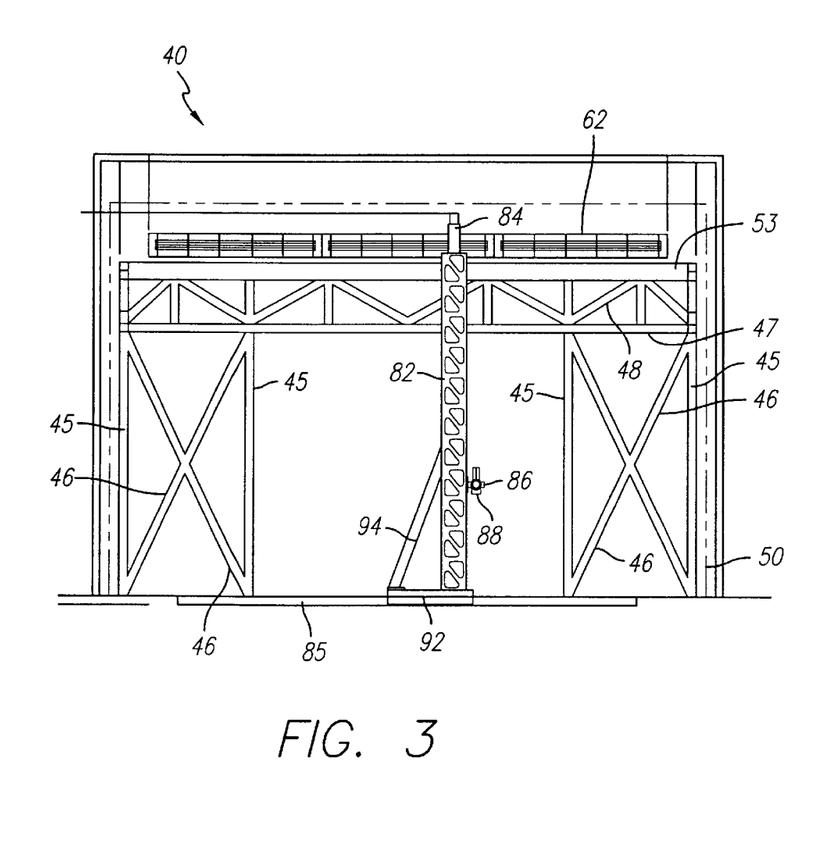
FIG. 3 is a side view of the robotic scanner of FIG. 2.
Figure 4:
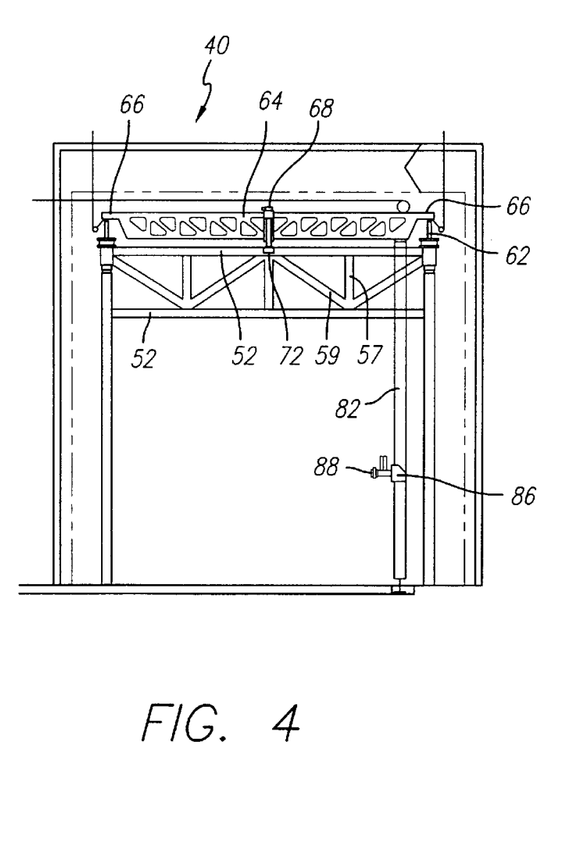
FIG. 4 is an end view of the robotic scanner of FIG. 2.

Referring now to FIGS. 2–4, a robotic scanner 40 for a near-field antenna measurement system of the present invention is illustrated. It should be apparent that a functional near-field antenna measurement system will further include the network analyzer, motor controller and computer elements described above, and for simplicity, these elements are omitted from FIGS. 2–4. The robotic scanner 40 is functionally equivalent to the robotic scanner 20 described above, but is larger to accommodate the testing of a large aperture or gravity sensitive antenna system by positioning the AUT in a test space 60 defined within the structure of the scanner 40. The particular configuration of the robotic scanner 40 illustrated in FIGS. 2–4 is referred to as a horizontal "H" frame construction, which will be fully understood from the following description.

The robotic scanner 40 comprises a generally rectangular skeleton or frame structure having left and right sides 42, 44, respectively. The sides 42, 44 are generally parallel to each other and provide structural support for main beams 53 that extend the full length of each of the sides. The test space 60 is defined by the large open region between the sides 42, 44, bounded by the test floor at the bottom and the main beams 53 at the top. The main beams 53 define the two upright elements of the "H" frame construction. In FIG. 2, only the structural skeleton of the right side 44 is illustrated in detail, but it should be apparent that the left side 42 has similar structural features.

More particularly, the sides 42, 44 of the frame structure are provided by a plurality of vertical columns 45 which are reinforced by cross-braces 46 for strength and rigidity. The vertical columns 45 and cross-braces 46 may be permanently or semi-permanently anchored to the test floor, such as by bolts or concrete. The vertical columns 45 and cross-braces 46 may be joined at an upper end thereof by sub-beams 47 that span the entire length of the two sides 42, 44. Likewise, the sub-beams 47 may be further coupled to stanchions 55 and cross-braces 48 that provide support to the main beams 53. The sides 42, 44 of the frame structure may be joined at the back end by sub-beams 52, which are further joined by stanchions 57 and cross-braces 59. The front end of the frame structure may be joined by a cross-beam 54 at an upper portion thereof. The entire frame structure, including the main beams 53, the cross-beam 54, the vertical columns 45, the cross-braces 46, 48, 49, the sub-beams 47, 52, and the stanchions 55, 57, may be assembled together using a welded, brazed, riveted or bolted construction, and may be comprised of steel, aluminum or other such high strength material. In operation, the frame structure may be partially or totally blanketed behind panels 56 of a microwave energy absorbent material.

The main beams 53 provide a stable platform for the controlled movement of a test probe (described below). A rail 62 is disposed above each one of the main beams 53 in parallel to provide a guide for movement of the test probe in an x-axis direction. The rails 62 must be leveled to ensure planarity of movement of the probe, and accordingly, shims or other such adjustments may necessarily be provided between the rails 62 and the respective main beams 53 to correct for any height irregularity of the operative surface of the rails. The rails 62 may be comprised of a stable, high strength material, such as steel. A bridge 64 is carried by the rails 62 in a manner to permit controlled movement of the bridge along the length of the rails. The bridge 64 extends orthogonally between the rails 62 in a y-axis direction, and defines the crossed element of the "H" frame construction. The opposite ends 66 of the bridge 64 taper to a reduced width at interface regions defined between the bridge and the operative surfaces of the rails 62.

A first probe carriage 68 is provided on the bridge 64 that is capable of movement along the span of the bridge. A microwave probe 72 extends from the first probe carriage 68 normal to a plane defined by the intersection of the x and y-axes, referred to herein as the horizontal test plane. Precision controlled motors (not shown) may be utilized to manipulate the bridge 64 along the length of the rails 62 and to manipulate the first probe carriage 68 along the span of the bridge 64, in association with other conventional mechanical control systems such as a rack and pinion drive. As known in the art, the microwave probe 72 is moved in a repeatable pattern relative to a stationery AUT disposed within the test space 60. The microwave probe 72 samples the amplitude and phase data that is emitted by the AUT in an upward direction relative to the horizontal test plane.

It should be appreciated that a robotic scanner 40 having a horizontal "H" frame construction as described above is generally known in the art; however, the robotic scanner of FIGS. 2–4 differs from the art by the addition of a vertical tower 82 coupled to one end of the bridge 64. The vertical tower 82 hangs downward in a z-axis direction parallel to the right side 44. The vertical tower 82 may include a guide 92 that travels along a track 85 disposed on the test floor. The guide 92 may be rigidly coupled to the vertical tower 82 by a cross-brace 94. Alternatively, the vertical tower 82 may be entirely unguided at the lower end thereof, but instead may hang freely from the connection point with the bridge 64. It should be apparent that the vertical tower 82 is moveable along the x-axis direction by movement of the bridge 64 along the rails 62. The perpendicularity of the vertical tower 82 with respect to the bridge 64 may be measured and controlled by use of a laser alignment system. An example of a high precision laser alignment system is disclosed in copending U.S. patent application Ser. No. 08/675,655, entitled "Dual Beam Laser Device For Linear And Planar Alignment," filed on Jul. 3, 1996, by Slater et al., and assigned to the same assignee as the present invention.

Figure 5:
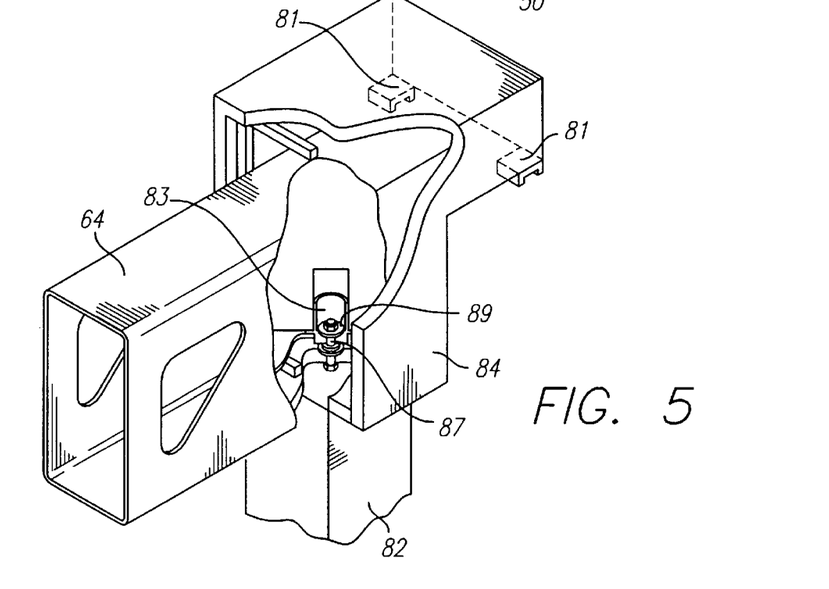
FIG. 5 is a partial perspective view of a mechanical interface between the vertical tower and a bridge of the robotic scanner.

An embodiment of a mechanical interface between the vertical tower 82 and the bridge 64 is illustrated in greater detail in FIG. 5. A brace 84 coupled to an end of the vertical tower 82 envelops the associated end 66 of the bridge 64. The brace 84 includes a pair of linear bearings 81 which engage the associated rail 62 to reduce friction between the brace and the rail as the bridge 64 is moved along the rails. The bridge 64 is coupled to the vertical tower 82 by use of a bolt 87 that engages a seat 83 provided in an internal web of the bridge. A pair of grommets 89 form a shock-absorbent seal between the bolt 87 and the respective elements of the bridge 64 and the vertical tower 82. The bolt 87 and grommets 89 act as a ball-joint to support the vertical tower 82 in the vertical direction, with the linear bearings 81 providing additional support and stability to the vertical tower.

Referring again to FIGS. 2–4, a second probe carriage 86 is provided on the vertical tower 82 that is capable of movement along the height of the vertical tower in the z-axis direction. A microwave probe 88 extends from the second probe carriage 86 normal to a plane defined by the intersection of the x and z-axes, referred to herein as the vertical test plane. Precision controlled motors (not shown) may be utilized to manipulate the probe carriage 86 along the vertical tower 82 in the same manner as described above with respect to the first probe carriage 68. As in the conventional near-field test system, the microwave probe 88 is moved in a repeatable pattern relative to a stationery AUT disposed within the test space 60. The microwave probe 88 samples the amplitude and phase data that is emitted by the AUT in an sideways direction relative to the vertical test plane.

During actual operation of the two-axis measurement system using the robotic scanner 40, it should be appreciated that only one of the microwave probes 72, 88 would be operable for a given near-field measurement. Accordingly, a single microwave probe and probe carriage may be provided with a measurement system that is simply removed and installed onto either the bridge 64 or the vertical tower 82 as desired, and two distinct probe carriages are thus not necessary. This way, only a single electrical connection from the probe to the network analyzer and from the motor controller to the probe carriage would be required. The bridge 64 and vertical tower 82 would necessarily be of the same gauge to permit compatibility of the probe carriage to either structure.

It should be apparent that a two-axis measurement system in accordance with the present invention would provide substantial additional utility without a significant increase in cost or complexity over conventional systems having a horizontal "H" frame construction. During a near-field antenna measurement using the horizontal test plane, for instance, the vertical tower 82 may be removed and stowed so that the tower structure does not effect the measurement. In the alternative, however, a near-field antenna measurement may be performed using both probes 72, 88, simultaneously, though it should be appreciated that redundant probes and probe carriages would be required for such an application, and that there would likely be an associated increase in complexity of the network analyzer, motor controller and computer elements as well to accommodate the additional signals.

Figure 6:
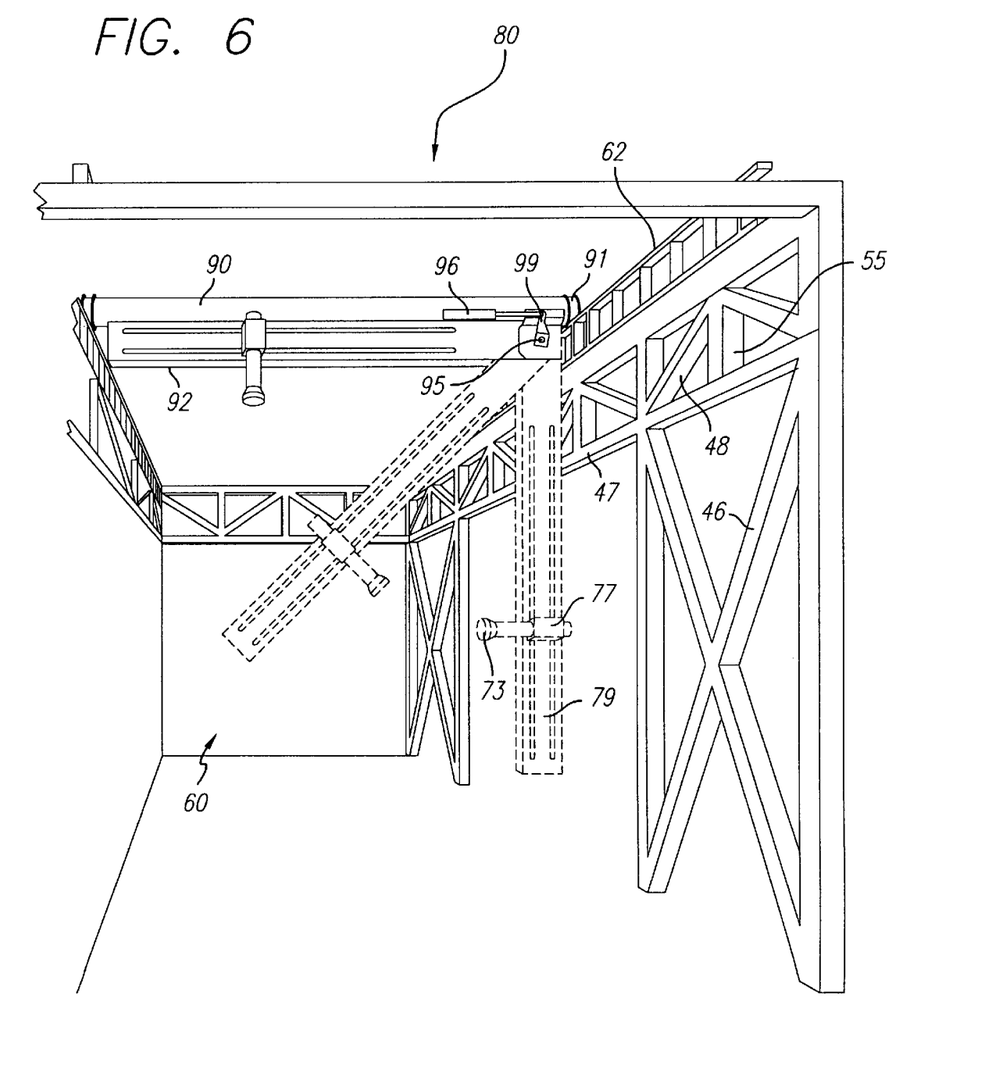
FIG. 6 is a partial perspective view of an alternative embodiment of the horizontally oriented robotic scanner having a pivotable boom to permit both vertically and horizontally oriented operation.
Figure 7:
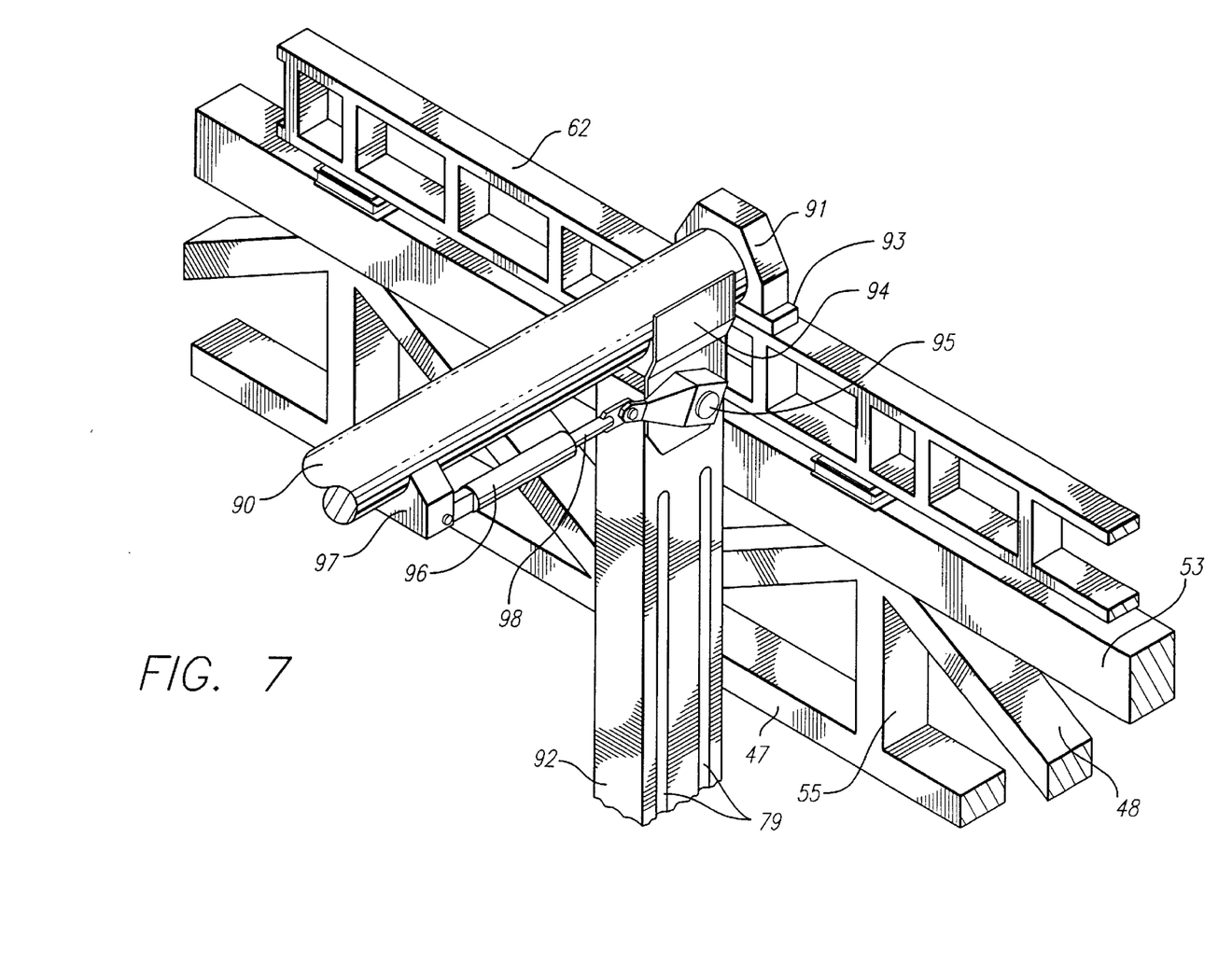
FIG. 7 is an enlarged perspective view of the pivotable boom of FIG. 6.

Referring now to FIGS. 6 and 7, an alternative embodiment of a robotic scanner 80 is illustrated. The robotic scanner 80 is similar to the robotic scanner 40 described with respect to FIGS. 2–4, having a frame structure that encloses a test space 60 therein. The following description of the robotic scanner 80 will thus be limited to differences from the robotic scanner 40 described above.

In particular, the robotic scanner 80 has a bridge 90 adapted to be carried along the rails 62 in the x-axis direction. The opposite ends 91 of the bridge have an interface region or carriage 93 adapted to traverse the operative surfaces of the rails 62. Unlike the bridge 64 described above, the bridge 90 does not carry a probe carriage. Instead, the bridge 90 has a pivotally coupled boom 92 that carries a single probe carriage 96. The boom 92 may attach to the bridge 90 by use of a bracket 94 affixed to an end of the bridge. A pin 95 extends through a corresponding pivot hole of the bracket 94 and through another hole that extends through an end of the boom 92. The pin 95 permits the boom 92 to pivot from a first horizontal or folded position in which the boom extends alongside the bridge 90 in the y-axis direction, and a second vertical or deployed position in which the boom extends perpendicularly to the bridge in the z-axis direction.

The boom 92 is selectively movable about the pivot point under the control of a hydraulic actuator 96. The hydraulic actuator 96 pivotally mounts to a flange 97 rigidly coupled to an underside of the bridge 90. A rod 98 coupled to a piston of the hydraulic actuator 96 is further coupled at an end thereof to a crank 99 that pivots about the pin 95. Accordingly, the boom 92 is pivoted to the first horizontal position with the rod 98 fully extended outwardly of the hydraulic actuator 96, and the boom is pivoted to the second vertical position with the rod full withdrawn inwardly of the hydraulic actuator. If desired, the boom 92 may also be moved to an intermediate position disposed along an arc defined between the first horizontal position and the second vertical position. It should be appreciated that other known systems besides hydraulic could be utilized to pivot the boom 92 in like manner, such as pneumatic or electromechanical actuating systems.

A probe carriage 77 is provided on the boom 92 that is capable of movement along a track 79 of the boom. A microwave probe 73 extends from the probe carriage 77, and is adapted to be configured so that the microwave probe is directed in either a left or a right direction relative to the boom 92 as seen from the front of the robotic scanner 80. Specifically, the microwave probe 73 may be selectively rotatable so that it can point in either direction, or alternatively, the microwave probe and/or probe carriage 77 may be selectively removed from the boom 92 and reinstalled in the desired direction. As in the previous embodiment, precision controlled motors (not shown) may be utilized to manipulate the probe carriage 77 along the boom 92, in association with other conventional mechanical control systems such as a rack and pinion drive.

As in the previous embodiment, the microwave probe 73 is moved in a repeatable pattern relative to a stationery AUT disposed within the test space 60 by cooperative movement of the bridge 90 and the probe carriage 77. If a horizontal test plane is desired, the boom 92 is pivoted to the first horizontal position and the probe 73 is configured so that it points downward. Alternatively, if a vertical test plane is desired, the boom 92 is pivoted to the second vertical position and the probe 73 is configured so that it points leftward. In either configuration, the microwave probe 73 samples the amplitude and phase data that is emitted by the AUT in a direction relative to the selected horizontal or vertical test plane. It should be apparent that this embodiment enables a relatively rapid reconfiguration of the test system between the horizontal and vertical orientations. Moreover, the intermediate position of the boom 92 between the horizontal and vertical positions may permit near-field tests of certain antenna systems having unique emission patterns.

Having thus described a preferred embodiment of the two-axis measurement system capable of operation in both a vertical and a horizontal orientation, it should be apparent to those skilled in the art that certain advantages of the within system have been achieved. It should also be appreciated that modifications, adaptations, and alternative embodiments thereof may be made within the scope and spirit of the present invention. The invention is further defined by the following claims.

What is claimed is:

1. A measurement system, comprising:
   a structural support frame including a plurality of support members disposed at first and second sides thereof, said support frame defining a test space between said first and second sides;
   a boom pivotally coupled to said structural support frame, said boom being selectively pivotable between a horizontal position and as vertical position, and further being adapted for controlled linear movement along a length of said structural support frame in a first axial direction;
   a test probe coupled to said boom, said test probe being adapted for controlled linear movement along a length of said boom in a second axial direction;
   whereby said test probe is selectively manipulable within a test plane of said test space defined by said first and second axial directions.

2. The measurement system of claim 1, wherein said structural support frame further includes at least two horizontally disposed parallel rails defining said length of said structural support frame at said sides thereof, said rails extending in said first axial direction.

3. The measurement system of claim 2, further comprising a bridge extending perpendicularly between said rails, said bridge being capable of controlled movement along said rails in said first axial direction over said length of said structural support frame.

4. The measurement system of claim 3, wherein said boom is pivotally mounted to an end of said bridge adjacent to one of said rails about said first axial direction, said boom being selectively pivotable between a folded position wherein said boom extends in parallel with said bridge, defining a horizontal test plane, and a deployed position wherein said boom extends in a direction orthogonal to said horizontal test plane, defining a vertical test plane;
   whereby cooperative movement of said bridge and said test probe permits selective movement of said test probe within said horizontal test plane while said boom is in said folded position and within said vertical test plane while said boom is in said deployed position.

5. The measurement system of claim 3, further comprising:
   a vertical tower coupled to said bridge orthogonally with said rails.

6. The measurement system of claim 1 wherein said boom is selectively pivotable to an intermediate position disposed along an arc defined between said horizontal position and said vertical position.

7. A measurement system, comprising:
   a structural support frame including a plurality of support members disposed at first and second sides thereof, said support frame defining a test space between said first and second sides; and
   means for selectively manipulating a test probe within each one of a horizontal test plane of said test space and a vertical test plane of said test space, the test probe performing a measurement while being manipulated within said test planes;

wherein said structural support frame further includes at least two horizontally disposed parallel rails defining a length of said structural support frame at said sides thereof, said rails extending in a first axial direction;

wherein said manipulating means further comprises a bridge extending perpendicularly between said rails in a second axial direction, said bridge being capable of controlled movement along said rails in said first axial direction over said length of said structural support frame;

wherein said manipulating means further comprises a boom pivotally mounted to said bridge about said first axial direction defined by said rails, said boom being selectively pivotable between a folded position wherein said boom extends in parallel with said bridge, and a deployed position wherein said boom extends in a third axial direction orthogonal to both said first and second axial directions; and wherein said boom is selectively pivotable to an intermediate position disposed along an arc defined between said folded and said deployed positions.

8. A measurement system, comprising:

a structural support frame including at least two horizontally disposed parallel rails defining a length of said structural support frame at opposite sides thereof, said support frame further defining a test space between said opposite sides;

a bridge extending perpendicularly between said rails capable of controlled movement along said rails over said length of said structural support frame, and a first probe carriage carried by said bridge permitting controlled movement along a span of said bridge;

a vertical tower rigidly coupled to said bridge orthogonally with said rails, and a second probe carriage carried by said vertical tower permitting controlled movement along a height of said vertical tower, whereby said vertical tower is adapted for controlled movement along said rails in association with said bridge;

wherein, said first probe carriage is selectively moveable within a horizontal test plane defined in a first axial dimension by said rails and in a second axial dimension by said bridge by cooperative movement of said bridge and said first probe carriage, and said second probe carriage is selectively moveable within a vertical test plane defined in said first axial dimension by said rails and in a third axial dimension by said vertical tower by cooperative movement of said bridge and said second probe carriage.

9. The measurement system of claim 8, wherein said structural support frame further comprises a plurality of vertical columns supporting said horizontally disposed parallel rails.

10. The measurement system of claim 8, wherein said first probe carriage further comprises a first test probe directed toward said test space.

11. The measurement system of claim 8, wherein said second probe carriage further comprises a second test probe directed toward said test space.

12. The measurement system of claim 8, wherein said vertical tower is coupled to an end of said bridge adjacent to one of said rails.

13. A measurement system, comprising:

a structural support frame including at least two horizontally disposed parallel rails defining a length of said structural support frame at opposite sides thereof, said rails extending in a first axial direction, said support frame further defining a test space between said opposite sides;

a bridge extending perpendicularly between said rails in a second axial direction, said bridge being capable of controlled movement along said rails in said first axial direction over said length of said structural support frame;

a boom pivotally mounted to said bridge about said first axial direction defined by said rails, said boom being selectively pivotable between a folded position wherein said boom extends in parallel with said bridge, and a deployed position wherein said boom extends in a third axial direction orthogonal to both said first and second axial directions; and a probe carriage carried by said boom capable of controlled movement along an extent of said boom;

wherein, said first position of said boom permits selective movement of said probe carriage within a horizontal test plane defined in said first and second axial dimensions by cooperative movement of said bridge and said probe carriage, and said second position of said boom permits selective movement of said probe carriage within a vertical test plane defined in said first and third axial dimensions by cooperative movement of said bridge and said probe carriage.

14. The measurement system of claim 13, wherein said structural support frame further comprises a plurality of vertical columns supporting said horizontally disposed parallel rails.

15. The measurement system of claim 13, wherein said probe carriage further comprises a test probe selectively directed toward said test space from either of said folded and deployed positions of said boom.

16. The measurement system of claim 13, wherein said boom is coupled to an end of said bridge adjacent to one of said rails.

17. The measurement system of claim 13, further comprising a hydraulic actuator coupled to said boom and said bridge providing said selective pivoting of said boom.

18. A measurement system, comprising:

a structural support frame including at least two horizontally disposed parallel rails defining a length of said structural support frame at opposite sides thereof, said rails extending in a first axial direction, said support frame further defining a test space between said opposite sides;

a bridge extending perpendicularly between said rails in a second axial direction, said bridge being capable of controlled movement along said rails in said first axial direction over said length of said structural support frame;

a boom pivotally mounted to said bridge about said first axial direction defined by said rails, said boom being selectively pivotable between a folded position wherein said boom extends in parallel with said bridge, and a deployed position wherein said boom extends in a third axial direction orthogonal to both said first and second axial directions; and a probe carriage carried by said boom capable of controlled movement along an extent of said boom;

wherein, said first position of said boom permits selective movement of said probe carriage within a horizontal test plane defined in said first and second axial dimensions by cooperative movement of said bridge and said probe carriage, and said second position of said boom permits selective movement of said probe carriage within a vertical test plane defined in said first and third axial dimensions by cooperative movement of said bridge and said probe carriage;

wherein said boom is selectively pivotable to an intermediate position disposed along an arc defined between said folded and said deployed positions.

* * * * *